United States Patent [19]
Beall

[11] Patent Number: 5,611,734
[45] Date of Patent: Mar. 18, 1997

[54] APPARATUS FOR PRODUCING WOODEN THREADS

[76] Inventor: Jerrold R. Beall, 541 Swans Rd., NE., Newark, Ohio 43055

[21] Appl. No.: 527,523

[22] Filed: Sep. 13, 1995

[51] Int. Cl.⁶ .............................. B21H 3/02; B27C 5/00
[52] U.S. Cl. ..................... 470/59; 144/2.1; 144/136.95; 144/154.5; 409/172
[58] Field of Search .............................. 470/59; 409/65, 409/73, 76, 172; 144/135.3, 134.1, 136.1, 136.95, 154.5

[56] References Cited

U.S. PATENT DOCUMENTS

| | | | |
|---|---|---|---|
| 4,287,627 | 9/1981 | Chambers | 409/76 |
| 5,127,452 | 7/1992 | Wilston | 144/135.3 |

OTHER PUBLICATIONS

Lee Valley 1991/92 Catalogue, p. 107, showing "B. Beall's Wood-Tapping & Threading Kit".

*Primary Examiner*—W. Donald Bray
*Attorney, Agent, or Firm*—Kilpatrick & Cody; John S. Pratt

[57] ABSTRACT

An improved wood threader that utilizes an aluminum plate as a router mounting base to which a mounting block, that may conveniently be wood, is attached, and to which interchangeable, machined, high-performance plastic threader inserts are attached with an indexing means that assures that each insert will be accurately positioned relative to a router bit or cutter.

7 Claims, 3 Drawing Sheets

APPARATUS FOR PRODUCING WOODEN THREADS

BACKGROUND OF THE INVENTION

Threaded structures made of wood and other materials have been utilized for joining objects for centuries, and a variety of devices and methods have been used for producing female (or internal) and male (or external) threads in wood. Some of the history of this technology and description of currently available devices for producing wooden threads are described in my uncommonly entertaining book, *The Nuts and Bolts of Woodworking*.

Internal threads can be produced cross-grain in wood relatively easily utilizing metal taps generally similar to the taps used for producing threads in metal. However, machining a wooden dowel to produce an external thread is considerably more difficult, particularly on a production basis and in certain woods. One successful method uses an electric router. The basic principles associated with use of an electric router having a rotating V-shaped or veining bit or cutter for producing a thread on a dowel are described in U.S. Pat. No. 4,287,627 issued Sept. 8, 1981 to Chambers.

The first commercially available threader using an electric router was my original Beall Wood Threader, an amazingly clever device having a molded plastic base on which an electric router or laminate trimmer is mounted. Injection-molded thermoplastic inserts are mounted within the base of the original Beall Wood Threader using screws positioned parallel to the longitudinal axis of the bore through the insert that receives the dowel. While the original Beall Wood Threader works extremely well, there are certain limitations associated with its design.

These limitations are a consequence of the exacting requirements for successfully threading wooden dowels. Apparatus for this purpose must be manufactured to extremely close tolerances and, in the case of some dimensions, adjustability must be possible.

Injection molding of thermoplastic materials is a process in which it is extremely difficult to hold close tolerances. Accordingly, it is difficult to manufacture the inserts in the original Beall Wood Threader to the required tolerances. Additionally, in each of the Chambers Pat. No. 4,287,621 and the original Beall wood Threader, the highly critical location of the router (and, in turn, the rotating axis of the router bit) was achieved by use of an index sleeve temporarily positioned within the threader base and into which the router bit or cutter projected. This required that the threader inserts in turn be located very accurately relative to the threader base so that the desired relationship between the rotating axis of the router cutter and the threader insert would be achieved through the intermediate positioning of the router relative to the threader base.

While the Chambers '627 patent arguably suggests, in FIG. 5, the possibility of using inserts for threading dowels having different diameters interchangeably with approximately the same cutter height (or projection), the '627 patent suggests no way to successfully produce such a structure. Doing so is impractical using the Chambers structure, is impractical utilizing injected molded inserts and is not possible in the original Beall Wood Threader.

SUMMARY OF THE INVENTION

The improved wood threader of the present invention utilizes an aluminum plate as a router mounting base to which a mounting block, that may conveniently be wood, is attached, and to which interchangeable, machined, high-performance plastic threader inserts are attached with an indexing means that assures that each insert will be accurately positioned relative to a router bit or cutter.

The inserts are machined from Delrin® or Polypenco Acetron G P (annealed) plastic or other stable, machinable material using a computer numerically controlled ("CNC") machining center.

The wood threader of the present invention thus overcomes the drawbacks associated with prior art wood threaders by making it possible to change from one dowel size to another without adjusting router cutter depth and without adjusting the location of the router on its base.

An improved indexing sleeve and indexing method make it virtually impossible to set the router depth with the index sleeve still in position, thereby reducing the possibility that the router will be turned on with the index sleeve still in position.

The mounting block makes it conveniently possible to hold the threader during use in a variety of manners while maintaining clear access to the front of the threader, which facilitates the threading operation.

These and other benefits of the present invention will be further understood by reference to the following descriptions of the drawings, to the drawings themselves, and to the claims.

DETAILED DESCRIPTION OF THE DRAWINGS

Figure 1:
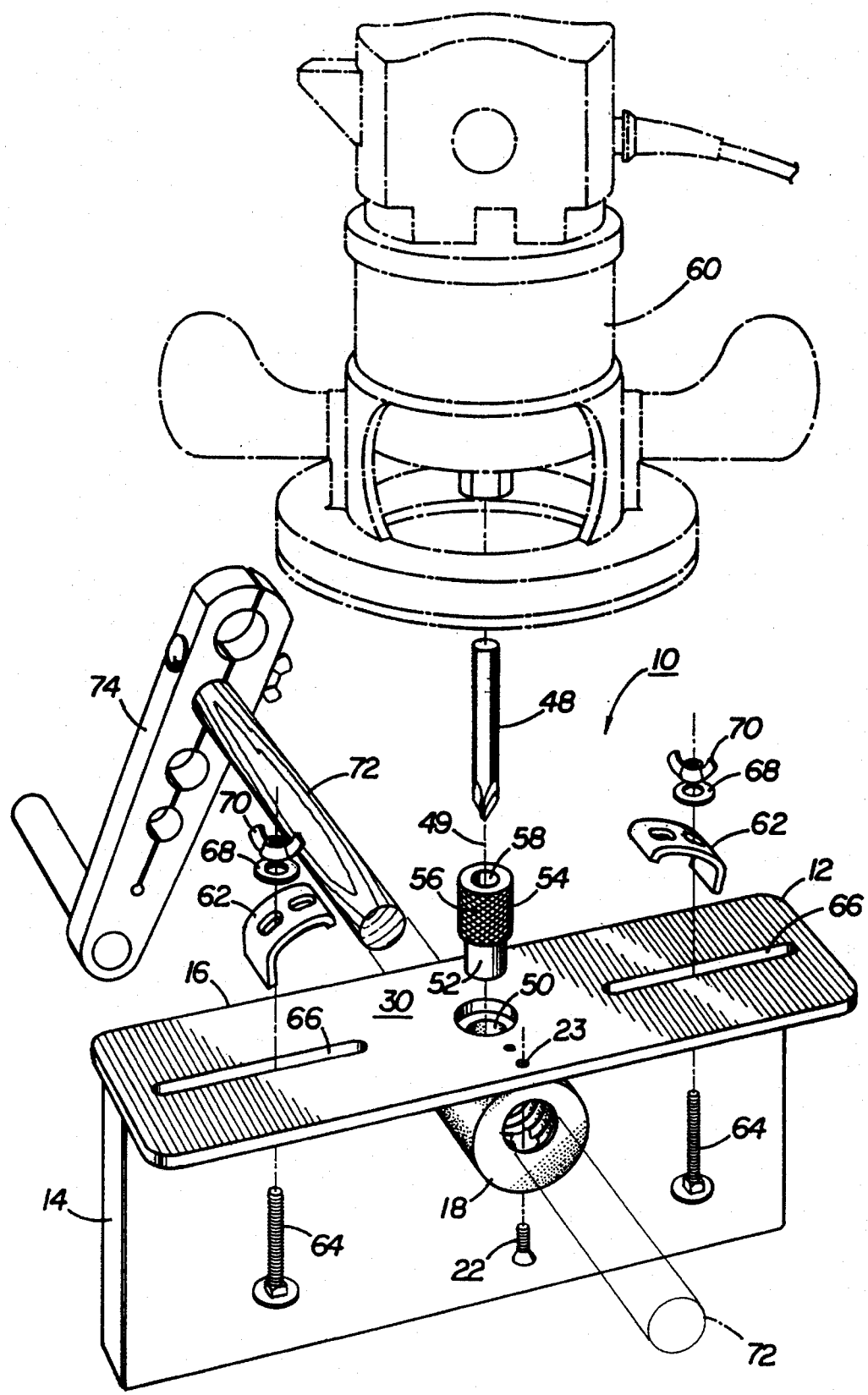
FIG. 1 is a perspective view of the top, back and left sides of the wood threader of the present invention shown with a veining cutter, indexing sleeve, affixing hardware and router (shown in broken lines) exploded away from the threader.
Figure 2:
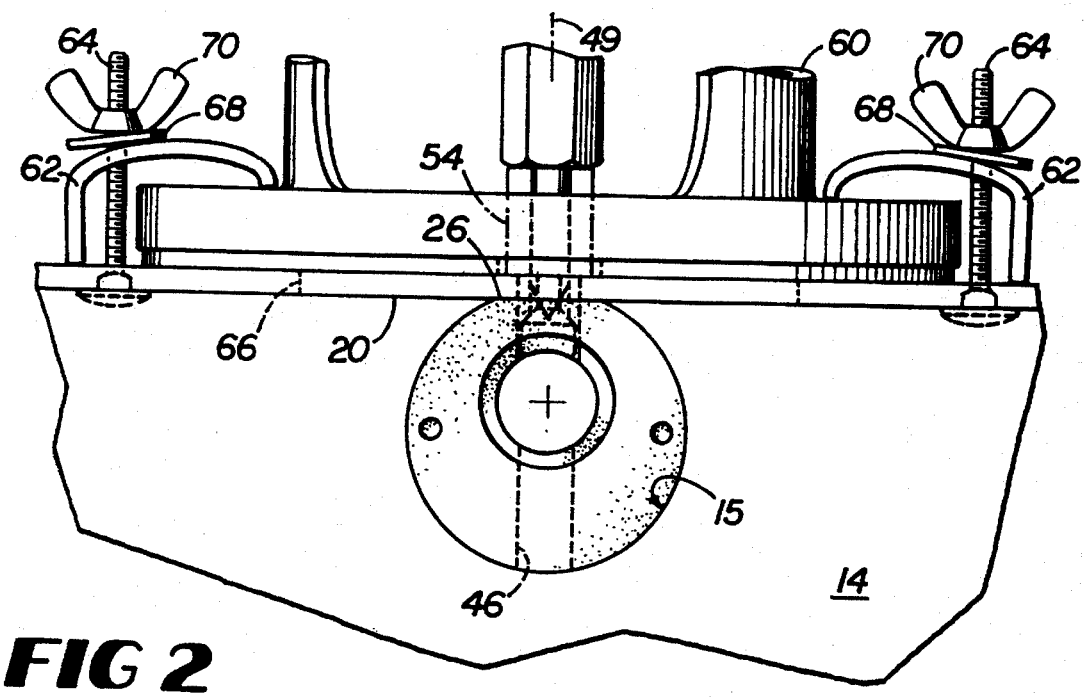
FIG. 2 is a fragmentary front elevation view of the wood threader of the present invention shown with a router clamped in place and with portions of the structure indicated in broken lines.

All of the figures illustrate a threader 10, to which an electric router 60 or laminate trimmer may be attached for machining a thread on the surface of a wooden dowel. The threader 10 comprises generally a rectangular base plate 12 to which a rectangular wooden mounting block 14 is attached at a right angle along one edge 16 of plate 12. The mounting block 14 is penetrated by a hole 15 of sufficient diameter to receive threader insert 18 so that the front face 19 of insert 18 may, if desired, be aligned with the front edge 16 of base plate 12. Threader 10 may be firmly held in use by grasping mounting block 14 within the jaws of a vise (not shown), such as a Tucker™ vise, or by passing screws or the like through block 14 into a stable object such as the front edge of a Veritas® workbench or mahogany dining table.

A generally cylindrical threader insert 18 visible in all the figures is affixed to the underside 20 of base 12 by first positioning a recess 24 (best visible in FIG. 4) located in the top of insert 18 to receive a protrusion 28 on the underside 20 of base 12. This protrusion 28 may, for instance, be a 0.125 inch diameter protrusion created by punching the top 30 of plate 12 a predetermined distance (such as 0.075 inch) from the perimeter of the index hole 32 in plate 12. A pin located in a hole in base 12 or any other appropriate protruding locating structure may be used as protrusion 28. Other means for locating insert 18 relative to base 12 may also be used. For instance a structure may protrude from insert 18 and be received in a recess in base 12. Specifically, a pin in either of insert 18 or base 12 may be received in a hole in the other of base 12 and insert 18.

By accurately machining all threader inserts 18 to have internal threads 34 that begin with the same relationship to recess 24 in the insert (and therefore, after utilizing the indexing sleeve 54, the same relationship to cutter 48), it is possible to interchange inserts without adjusting the depth or lateral position of cutter 48.

Figure 3:
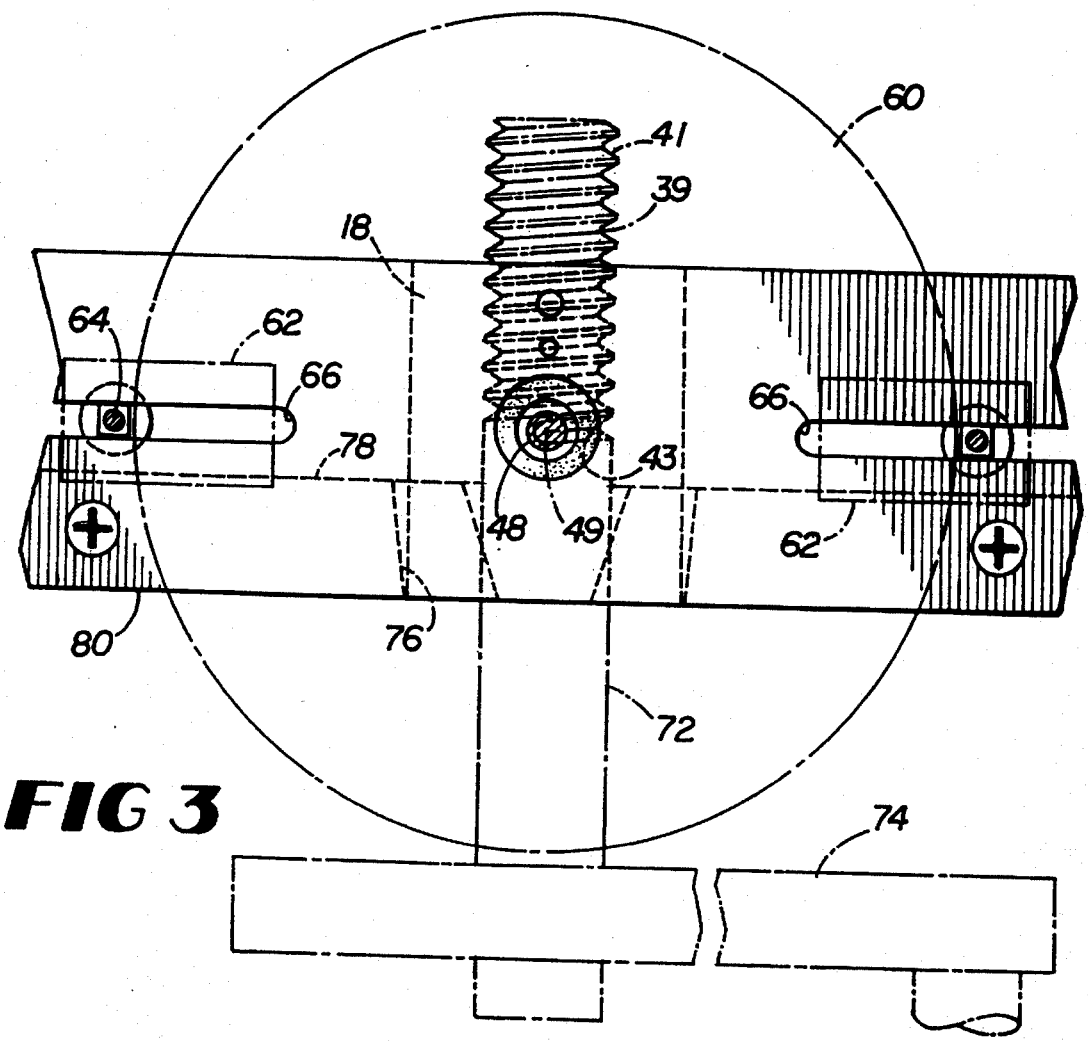
FIG. 3 is a fragmentary top plan view of the wood threader of the present invention with the position of a router, the router clamping hardware, and portions of the underlying structure shown in broken lines.
Figure 4:
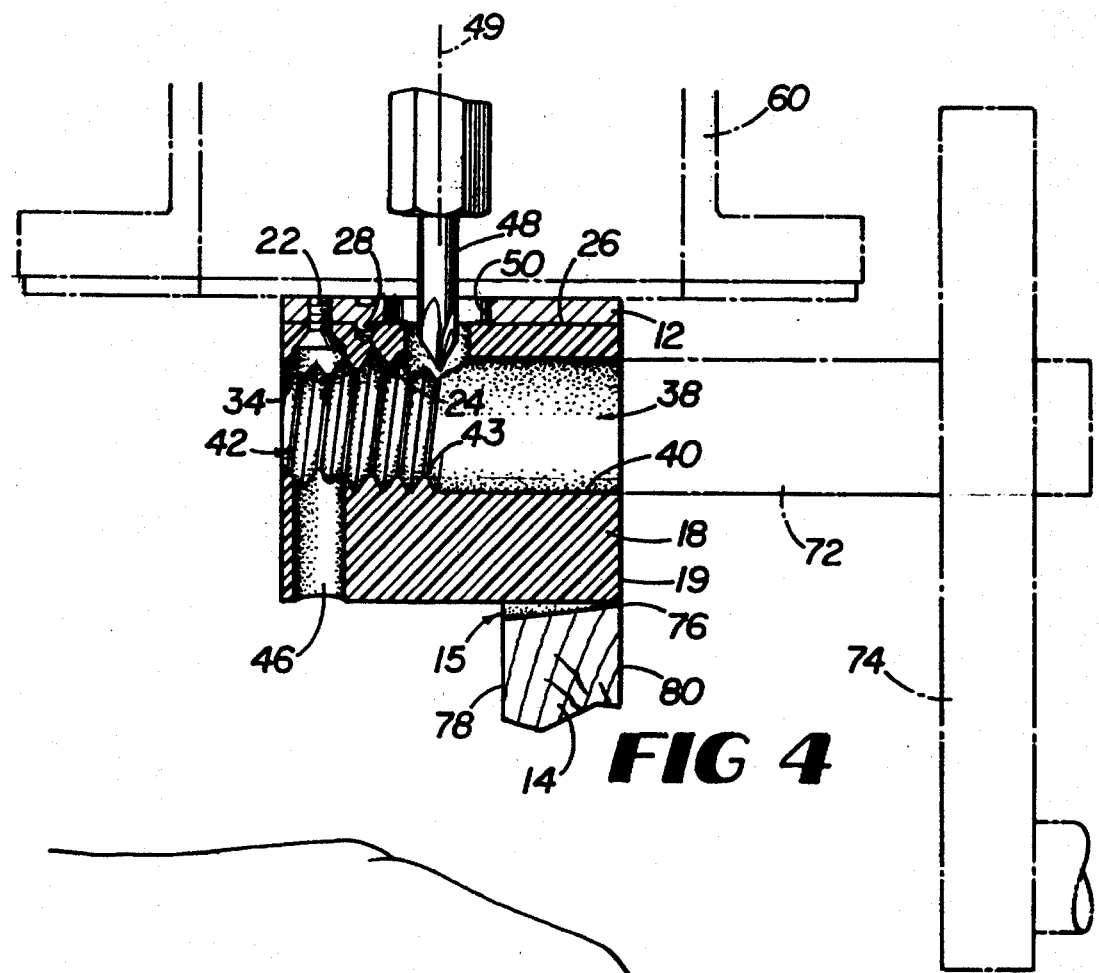
FIG. 4 is a fragmentary side elevational view of the wood threader of the present invention in section through the lateral center line of the device.
Figure 5:
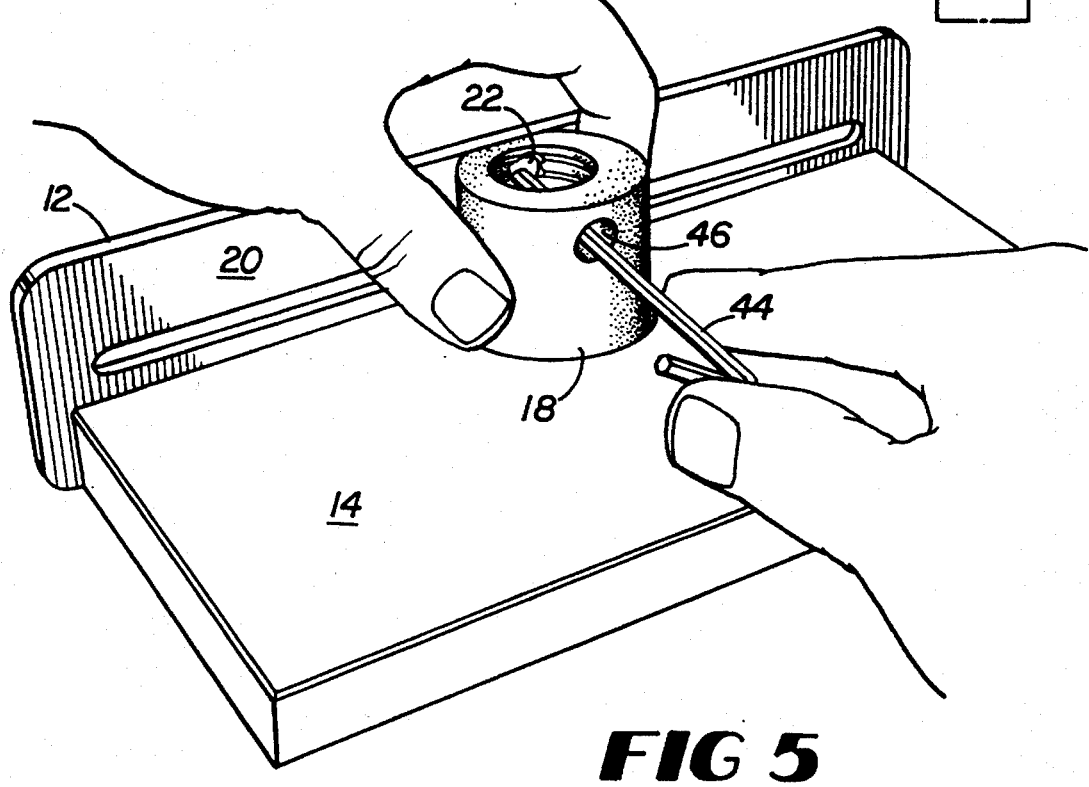
FIG. 5 is a perspective view showing the underside and back of the wood threader of the present invention and illustrating manipulation of an Allen head screw for fixing an insert in place.

Insert 18 is affixed to the underside 20 of base 12 utilizing a fixing screw 22 that may typically be a flat head Allen or hex recess screw that is manipulated as illustrated in FIG. 5 by inserting an Allen wrench 44 through access hole 46 that passes upward through insert 18. Fixing screw 22 passes into a threaded hole 23 in base 12. Insert 18 is further supported, and its top flat surface 26 is urged against the underside 20 of base 12 by the rim 76 of the hole 15 in mounting block 14. Hole 15 is tapered from the back face 78 to the front face 80 of mounting block 14, as is best shown in FIGS. 3 and 4, so that rim 76 is the same shape and size as insert 18, and insert 18 fits tightly within rim 76. This provides support for insert 18 in addition to that provided by screw 22 and augments the role of screw 22 and the combination of recess 24 and protrusion 28 in accurately positioning insert be relative to base 12.

As will be appreciated by reference to the figures, particularly including FIG. 4, insert 18 is machined to have a bore 38 running from the front to the back of the insert along an axis parallel to the top 26 of the insert 18. The front section 40 of the bore 38 is smooth and is nominally the same diameter as dowels to be threaded in that insert. As will be understood by those skilled in the art, the actual diameter of the smooth portion 40 of bore 38 should be sufficiently larger in diameter than the dowels to be threaded to permit them to be rotated without binding. For instance, appropriate diameters for smooth portion 40 may be:

| Nominal Diameter of Dowel | Diameter of Smooth Portion 40 |
| --- | --- |
| ½" | .515" |
| ⅝" | .640" |
| ¾" | .770" |
| 1" | 1.020" |
| 1¼" | 1.275" |
| 1½" | 1.525" |

The rear portion 42 of bore 38 is machined with an internal thread having the pitch and depth desired for threads to be produced utilizing the threader 10 and insert 18. As can be appreciated by reference to FIG. 3, the desired location of cutter 48 positions its axis of rotation 49 in the center of the crest 43 of insert internal thread 34 in bore 38 as thread 42 is projected into index hole 50 in insert 18. This will cause the root 39 of an external thread 41 cut in advancing dowel 72 to be engaged by and precisely align with the crest 43 of the thread 34 in insert 18. In order for the indexing scheme of the present invent to function properly, the center of index hole 50 in each insert 18 must lie on this axis of rotation 49 of cutter 48.

During use of threader 10, a router veining bit or cutter 48 is used having the same included angle as the desired angle between walls of the thread separated by root 39. Cutter 48 protrudes down through hole 32 in base 12 and index hole 50 in insert 18. The diameter of insert 18 of index hole 50 is a very close fit with the outside diameter of an indexing surface 52 of index sleeve 54, which also has a larger diameter portion 56 that may desirably be knurled and which is penetrated by a sleeve bore 58 within which cutter 48 fits to close tolerances.

After insert 18 has been fixed to base 12 as described above, a router or trimmer 60 may be mounted on the threader 10 as follows. Cutter 48 is firmly fixed in router 60 collet, index sleeve 54 is positioned with index surface 52 within index hole 50 in insert 18, and router 60 is positioned on the top 30 of base 12 with cutter 48 within sleeve bore 58 of sleeve 54. Clamps 62 may then be used to firmly clamp router 60 to base plate 12 by passing bolts 64 through slots 66 (that are generally longitudinally centered in base 12) and then through clamps 62 washers 68 and wing nuts 70. Alternatively, bolts 64 may be passed directly through appropriate base portions of router 60 for affixation without the use of clamps 62.

After router 60 is appropriately positioned and firmly clamped in place, cutter 48 is raised so that index sleeve 54 may be removed before utilization of threader 10. The use of a relatively tall index sleeve 54 having a larger diameter portion 56 to limit travel into index hole 50 in insert 18, in combination with typical lengths of cutter 48 (on the order of two inches (2")) makes it very difficult for index sleeve 54 inadvertently to be left in place while attempting to adjust the depth of cutter 48. The height of index sleeve 54 should be between ¾" and 1¼" and preferably should be about one inch (1") tall, and the larger diameter portion 50 may be approximately five-eighths inch (⅝") tall. This safety feature of the design of index sleeve 54 reduces the possibility of inadvertent damage to threader 10.

After index sleeve 54 is removed, the height of cutter 48 is adjusted so that it protrudes the appropriate amount into insert 18, as illustrated in FIG. 4, causing a thread of appropriate depth to be cut. A thread may then be formed by switching on the router 60 and advancing a dowel 72 into the smooth portion 40 of bore 38 in insert 18 so that the cutter engages the dowel and the groove formed in the dowel 72 is in turn engaged by thread 42 as the dowel 72 is simultaneously advanced and rotated. Rotation of dowel 72 may be facilitated by use of a handle of any appropriate type, such as handle 74 illustrated in FIG. 1.

Use of aluminum for the base plate 12 provides a substantially stiffer, more accurate and more stable material than a plastic base, particularly bases made of thermoplastic material. Protrusion 28 can also be conveniently produced with accurate size and placement in an aluminum plate. Other appropriate base materials and structures, including steel, and suitably stiff and stable plastic ones, may also be used.

The inserts 18 of the present invention are manufactured from Delrin®, Polypenco Acetron G P (annealed) or an equivalent high-performance plastic rod that is first cut into blanks (cylindrical sections) and then machined on a Haas CNC machining center. These materials provide low-friction surfaces against which dowel surfaces freely slide. Formation of the internal threads in inserts 18 is accomplished with a single point tool employing helical interpolation by the machining center. Delrin® plastic is available from Dayton Plastics, 3577 Interchange Road, Columbus, Ohio. Polypenco Acetron G P (annealed) is also available from Dayton Plastics. Other stable, machinable materials are usable, including other plastics, metals and metal alloys, specifically including aluminum and brass.

As will be understood by those skilled in the art, numerous modifications and changes can be made to the embodiment of the present invention described above and illustrated in the accompanying drawings without departing from the spirit of the invention or the scope of the following claims.

For instance, numerous other configurations of base 12 and mounting block 14 can be utilized. It should be recognized, however, that it is desirable that structure be provided in threader 10 to permit the threader conveniently to be grasped in the jaws of a woodworking vise, since such vises are typically present where the threader of the present invention will be used, and that it should be so possible to grasp the threader 10 without unduly obstructing access to the front, back or top of the threader 10. In particular, it is important that it be possible to rotate handle 74 as freely as possible and continue rotating it as close as possible to the front of threader 10. Mounting of the base of the threader disclosed in the Chambers Pat. No. 4,287,627 to achieve this objective was not possible, and doing so utilizing the original Beall Wood Threader was likewise not possible in the manner enabled by the present invention.

I claim:

1. Apparatus for threading wooden dowels utilizing an electric router and rotating cutter comprising:
   (a) a base having an aperture through which the cutter may protrude,
   (b) a means for removably fixing the router on the base so that the cutter protrudes through the aperture in the base,
   (c) a threader insert affixed to the base so that the cutter may protrude into the threader insert through a hole in the insert,
   (d) a protrusion from one of the base and the insert and a recess in the other of the insert or base for receiving the protrusion so that the insert may be removed and replaced or other inserts may be affixed to the base in a position established by cooperation between the protrusion and the recess.

2. Apparatus for threading wooden dowels having a diameter utilizing an electric router and a rotating cutter, the apparatus comprising:
   (a) a base having an aperture through which the cutter may protrude,
   (b) a means for removably fixing the router on the base so that the cutter protrudes through the aperture in the base,
   (c) threader insert affixed to the base, the insert comprising a generally cylindrical section of stable material machined to have:
      (i) a flat exterior surface for positioning parallel to the router base,
      (ii) a longitudinal bore through which the dowels pass during threading, the longitudinal bore having:
         (1) a first smooth portion slightly larger in diameter than the diameter of the dowels to be threaded, and
         (2) a second portion machined to form an internal spiral thread having a crest and having a desired pitch, shape and depth,
      (iii) a first transverse bore that penetrates the flat surface normal to that surface and is coaxial with the projected location of the crest of the thread in the first transverse bore,
      (iv) a screw hole penetrating the flat surface and coaxial with a second transverse bore for providing access to a screw inserted through the screw hole from within the longitudinal bore,
      (v) a recess in the flat surface for receiving a locating structure protruding from the apparatus,
   (d) a protrusion from one of the base and the insert and a recess in the other of the insert or base for receiving the protrusion so that the insert may be removed and replaced or other inserts may be affixed to the base in a position established by cooperation between the protrusion and the recess.

3. A threader insert for use with an apparatus to which an electric router having a base is attached for forming a spiral thread on a wooden dowel having a diameter, the insert comprising a generally cylindrical section of stable material machined to have:
   (a) a flat exterior surface for positioning parallel to the router base
   (b) a longitudinal bore through which the dowel passes during threading, the longitudinal bore having:
      (i) a first smooth portion slightly larger in diameter than the diameter of the dowel of be threaded, and
      (ii) a second portion machined to form an internal spiral thread having a crest and having a desired pitch, shape and depth,
   (c) a first transverse bore that penetrates the flat surface normal to that surface and is coaxial with the projected location of the crest of the thread in the first transverse bore,
   (d) a screw hole penetrating the flat surface and coaxial with a second transverse bore for providing access to a screw inserted through the screw hole from within the longitudinal bore,
   (e) a recess in the flat surface for receiving a locating structure protruding from the apparatus.

4. The threader insert of claim 3, wherein the stable material is selected from the group consisting of Delrin® plastic and Polypenco Acetron G P (annealed) plastic.

5. Apparatus for threading wooden dowels utilizing an electric router and rotating cutter comprising:
   (a) a base having an aperture through which the cutter may protrude,
   (b) means for removably fixing the router on the base so that the cutter protrudes through the aperture in the base,
   (c) a threader insert affixed to the base so that the cutter may protrude into the threader insert through a hole in the insert,
   (d) a protrusion from one of the base and the insert and a recess in the other of the insert or base for receiving the protrusion so that the insert may be moved and replaced or other inserts may be affixed to the base in a position established by cooperation between the protrusion and the recess, and
   (e) an indexing sleeve for locating the router relative to the insert by temporarily:
      (i) positioning the sleeve around the cutter while the cutter is mounted in the router and
      (ii) positioning a first portion of the sleeve within the hole in the insert.

6. The apparatus of claim 5 wherein the indexing sleeve is substantially as tall as the projection of the cutter from the router.

7. The apparatus of claim 6 wherein a second portion of the indexing sleeve is larger in diameter than the first portion.

* * * * *